(12) United States Patent
Jovanovic

(10) Patent No.: US 10,453,358 B2
(45) Date of Patent: Oct. 22, 2019

(54) BUTTONS, BEADS, AND REMOVABLE CLIPS BEARING BRAILLE INDICIA FOR FABRIC

(71) Applicant: Alexa Roma Jovanovic, Toronto (CA)

(72) Inventor: Alexa Roma Jovanovic, Toronto (CA)

( * ) Notice: Subject to any disclaimer, the term of this patent is extended or adjusted under 35 U.S.C. 154(b) by 160 days.

(21) Appl. No.: 15/482,296

(22) Filed: Apr. 7, 2017

(65) Prior Publication Data

US 2017/0294141 A1    Oct. 12, 2017

Related U.S. Application Data

(60) Provisional application No. 62/319,562, filed on Apr. 7, 2016.

(51) Int. Cl.
*G09B 21/00* (2006.01)
*A44B 1/04* (2006.01)
*A44B 1/18* (2006.01)
*A44B 99/00* (2010.01)

(52) U.S. Cl.
CPC .............. *G09B 21/003* (2013.01); *A44B 1/04* (2013.01); *A44B 1/18* (2013.01); *A44B 99/00* (2013.01)

(58) Field of Classification Search
USPC ................... 434/112, 113; 2/209.11, 209.13, 2/244–246, 406; 40/1.6, 5, 661.04, 666; 63/33, 38, 40
See application file for complete search history.

(56) References Cited

U.S. PATENT DOCUMENTS

| | | | | |
|---|---|---|---|---|
| 3,518,729 A * | 7/1970 | Merser | ...................... | A44B 1/24 2/265 |
| 4,471,510 A * | 9/1984 | DeRosa | ................... | A44B 1/22 24/114.7 |
| 4,879,882 A * | 11/1989 | Johnson | ............... | A44C 15/004 63/4 |
| 5,167,505 A * | 12/1992 | Walsh | ...................... | G09B 1/16 434/200 |
| 5,507,649 A * | 4/1996 | Troudet | ................. | G09B 5/065 434/112 |
| 5,839,215 A * | 11/1998 | Lasprogata | ............... | G09F 3/02 40/299.01 |
| 6,148,484 A * | 11/2000 | Andreae, Jr. | .......... | A63B 57/00 24/3.11 |
| 6,397,390 B1 * | 6/2002 | Henderson | ............. | A41D 27/08 2/115 |
| 6,442,972 B1 * | 9/2002 | Watson | .................. | A44C 13/00 63/23 |
| 6,481,134 B1 * | 11/2002 | Aledo | ..................... | B32B 33/00 40/630 |

(Continued)

*Primary Examiner* — Kurt Fernstrom

(57) ABSTRACT

A clip bearing Braille indicia removably attachable to fabric comprises a body member having a face bearing Braille indicia and a clipping member configured to removably clip the body member to the fabric with the Braille indicia facing outwardly. A button bearing Braille indicia for attachment to fabric includes a body having a face bearing Braille indicia and attachment means for facilitating attachment of the body of the button to the fabric with the Braille indicia facing outwardly. A bead bearing Braille indicia for attachment to an article using thread comprises a body having a face bearing Braille indicia and a passage, through the body beneath the face, for receiving the thread.

17 Claims, 8 Drawing Sheets

(56) References Cited

U.S. PATENT DOCUMENTS

| | | | |
|---|---|---|---|
| 6,519,779 B1 * | 2/2003 | Taguchi | A42B 1/248 2/195.1 |
| 6,694,526 B1 * | 2/2004 | Tate | A42B 1/24 2/209.12 |
| 6,841,134 B2 | 1/2005 | Hanus et al. | |
| 7,055,342 B2 * | 6/2006 | Minassian | A44C 5/0015 116/284 |
| 7,207,467 B1 * | 4/2007 | Raja | G09B 21/003 222/142.2 |
| 7,543,460 B2 * | 6/2009 | Cruise | G09F 19/00 63/21 |
| 7,828,553 B2 * | 11/2010 | Baerg | G09B 1/14 434/203 |
| 8,424,231 B2 * | 4/2013 | Sliwa | G09F 3/06 2/406 |
| 8,449,299 B1 * | 5/2013 | Sheeley | G09B 19/02 434/203 |
| 8,672,360 B2 * | 3/2014 | Fracek | B42D 25/29 281/2 |
| 8,839,727 B2 | 9/2014 | Kampmann | |
| 2005/0037323 A1 * | 2/2005 | Basson | G09B 19/00 434/236 |
| 2006/0117617 A1 * | 6/2006 | Peterson | A44C 3/001 40/1.6 |
| 2009/0007597 A1 * | 1/2009 | Hanevold | A44C 5/0015 63/1.14 |
| 2009/0119819 A1 * | 5/2009 | Thompson | A42B 1/002 2/209.13 |
| 2010/0012017 A1 * | 1/2010 | Miller | A61B 5/015 116/201 |
| 2012/0005809 A1 * | 1/2012 | Johnson | A42B 1/248 2/209.13 |
| 2015/0047100 A1 * | 2/2015 | Wilson | A42B 1/248 2/209.3 |
| 2017/0196313 A1 * | 7/2017 | Marin | A44B 1/34 |

* cited by examiner

BUTTONS, BEADS, AND REMOVABLE CLIPS BEARING BRAILLE INDICIA FOR FABRIC

CROSS REFERENCE TO RELATED APPLICATIONS

The present application claims the benefit of U.S. Provisional Patent Application No. 62/319,562 filed on Apr. 7, 2016, the entire disclosure of which is hereby incorporated by reference hereinto.

TECHNICAL FIELD

The present disclosure relates to buttons, beads, and removable clips bearing Braille indicia, for use with fabric, such as garments or fashion accessories.

BACKGROUND

For a non-sighted person, it may be difficult or impossible to determine information about a fabric item, such as a garment, bedding, or curtains, or a fashion accessory, such as a hat, scarf or purse, that the person may wish to purchase, wear, or use. Information that may be of interest may include fabric color or pattern, fabric content, textile information, sizing, style, manufacturing location, or care information.

Metal tags that indicate colors in Braille are known, but may be heavy, and in the case of clothing, may be uncomfortable for the wearer or may damage fabric.

SUMMARY

According to one aspect of the present disclosure, there is provided a clip bearing Braille indicia removably attachable to fabric, the clip comprising: a body member having a face bearing Braille indicia, the Braille indicia being one or more Braille characters; and a clipping member configured to removably clip the body member to the fabric with the Braille indicia facing outwardly.

According to another aspect of the present disclosure, there is provided a button bearing Braille indicia for attachment to fabric, the button comprising: a body having a face, the face bearing Braille indicia, the Braille indicia being one or more Braille characters; and attachment means for facilitating attachment of the body of the button to the fabric with the Braille indicia facing outwardly.

According to a further aspect of the present disclosure, there is provided a bead bearing Braille indicia for attachment to an article using thread, the bead comprising: a body having a face, the face bearing Braille indicia, the Braille indicia being one or more Braille characters; and a passage through the body beneath the face, the passage for receiving the thread.

Other features will become apparent from the drawings in conjunction with the following description.

BRIEF DESCRIPTION OF THE DRAWINGS

In the figures which illustrate example embodiments.

DETAILED DESCRIPTION

Figure 1:
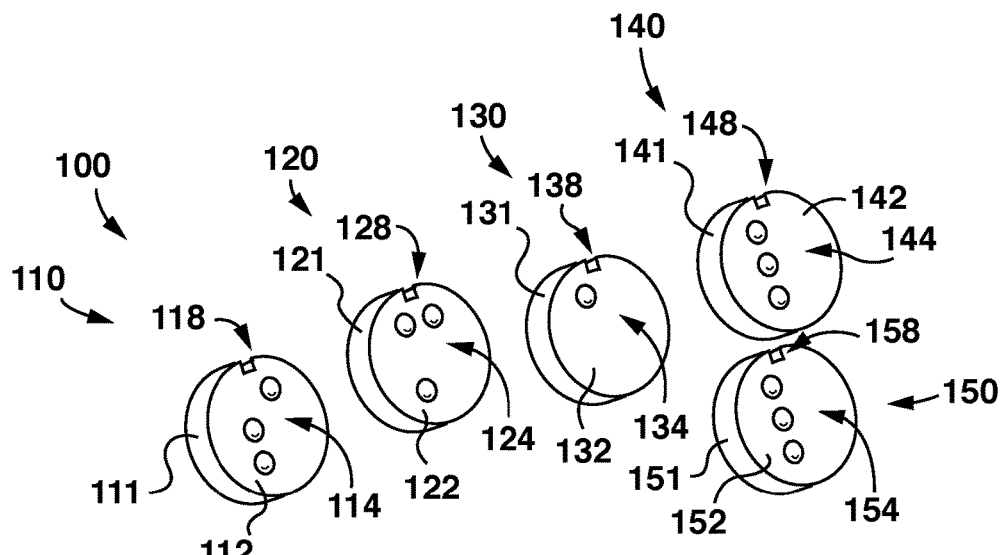
FIG. 1 is a front perspective view of a set of Braille buttons.

In the description that follows, terms such as "upper," "lower," "vertically," "horizontally," "top," "leftmost" and "beneath" used with respect to elements appearing in the drawings or described textually should not be understood to necessarily connote a particular orientation of the elements during use. As used herein, the term "exemplary" means "an example of" and does not necessarily connote that the example is preferred or superior in any way.

Braille Buttons

Referring to FIG. 1, a set 100 of five Braille buttons 110, 120, 130, 140 and 150 is depicted in perspective view. The buttons are suitable for attachment to a fabric such as a garment or a fashion accessory such as a hat, scarf, or purse for example.

Each of the exemplary buttons 110, 120, 130, 140, and 150 of FIG. 1 has a disk-shaped body 111, 121, 131, 141, and 151 with a circular front face 112, 122, 132, 142 and 152, respectively. The diameter of the disk-shaped button may be approximately one-half inch in some embodiments. The body is the part of a button that is passed through a buttonhole (slit) should the button be used for buttoning or fastening an article.

In the present embodiment, the circular front face 112, 122, 132, 142, and 152 of each button body bears a single Braille character 114, 124, 134, 144, and 154 ("S," "M," "A," "L," and "L" respectively in the illustrated example). Each Braille character comprises one or more raised dots. In accordance with Braille conventions, the dots are arranged in a two by three grid, with the spacing between adjacent dots in a row or column being uniform.

Raised dots may be integrally formed with the body of the button, such that the dots are made from the same material as the rest of the button. For example, to manufacture a plastic Braille button, the entire button, including the body and the raised dots, may be injection molded as a unit using a mold. Distinct molds may be used to form buttons with distinct Braille characters.

Raised dots forming Braille indicia may have the same color, texture and and/or appearance as the button surface. This may render the Braille indicia unobvious or unobtrusive to a sighted observer of the button. Unobtrusiveness may be desirable for some non-sighted users of the button, who may wish to avoid making their vision impairment apparent to others, e.g. in order to avoid perceived stigma.

Alternatively, the dots may be made to have a distinct color and/or texture from the remainder of the button, possibly because they are made from a different material. For example, each dot may be formed using a single drop of a colored adhesive material, such as epoxy, applied to a face of a button body.

Regardless of which Braille character is represented on a button, i.e. regardless which one(s) of the six grid positions of a Braille character has a raised dot, the position of the grid on the face of the button should be consistent between different ones of the buttons 110, 120, 130, 140 and 150. This may facilitate distinguishing between distinct Braille characters on different buttons.

Each button has attachment means for facilitating attachment of the button to a garment or other fabric, e.g. via sewing, with the Braille indicia facing outwardly. An example form of attachment means is illustrated in FIG. 2.

Figure 2:
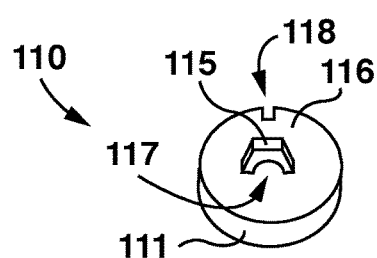
FIG. 2 is a rear perspective view of one of the Braille buttons of FIG. 1.

FIG. 2 is a rear perspective view of one of the buttons 110 of FIG. 1. The other buttons 120, 130, 140, and 150 may have a similar design. As illustrated, the button 110 has attachment means comprising a shank 155 protruding from the middle of a rear face 116 of the button body 111, on an opposite side of the button body from the Braille indicia 114 (FIG. 1). The shank 115 defines a hole 116 for receiving a thread that may be used to attach the button 110 to fabric. Other button embodiments may employ different attachment means that are not shanks. Various examples of alternative attachment means are described below.

As illustrated in FIG. 1, each of the buttons 110, 120, 130, 140, and 150 defines a respective tactile button orientation indicator 118, 128, 138, 148, and 158. The tactile button orientation indicator allows the orientation of the button, and thus the orientation of the Braille character borne on its face, to be determined by touch. Since one Braille character may be confused for another if rotated, the tactile button orientation indicator may help to reduce confusion on the part of a non-sighted user regarding the identity of the Braille character that is indicated on a face of the button. For example, if a non-sighted person were to purchase a Braille button with a view to attaching the button to an already owned garment, that person may use the tactile button orientation indicator during attachment to ensure proper or desired button orientation, e.g. relative to garment orientation or relative to an orientation of other buttons.

In the present example, the tactile button orientation indicator is a notch or indentation at the top (12 o'clock position) of each button. The notch may for example be positioned approximately midway between the top two positions of the notional two by three Braille grid, regardless of which one(s) of the grid positions has a raised dot.

Other forms of tactile button orientation indicators besides notches may alternatively be used and are not necessarily positioned at the top of the button. For example, the tactile button orientation indicator may be a notch at a particular location on a rear face of the button. In another example, the tactile button orientation indicator may be a protrusion such as a small raised rectangle on the rear face of a button, e.g. above or below the attachment means (e.g. above a shank) or possibly forming part of the attachment means (e.g. a tactile feature on a surface of a shank).

Figure 3:
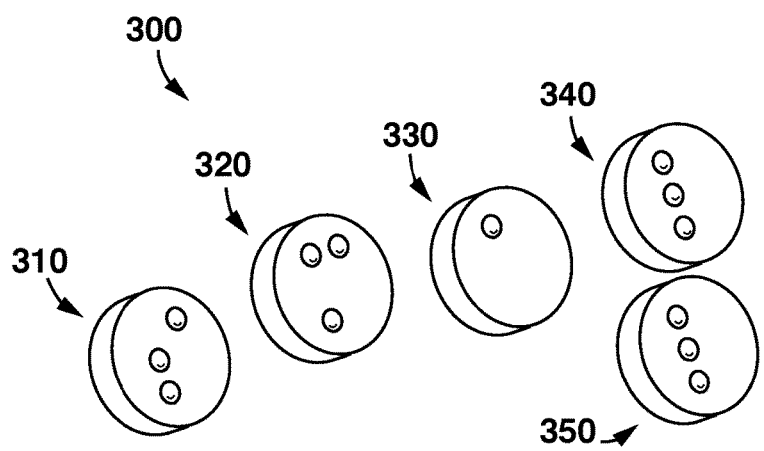
FIG. 3 is a front perspective view of another set of Braille buttons.

Tactile button orientation indicators are not necessarily present in all button embodiments. For example, FIG. 3 depicts, in front perspective view, a set 300 of five buttons 310, 320, 330, 340 and 350 without tactile orientation indicators. The buttons are the same as buttons 110, 120, 130, 140, and 150 of FIG. 1 respectively but lack any counterparts to indicators 118, 128, 138, 148, and 158. Such buttons may be usable despite the lack of an indicator, e.g., if the button has been attached to an article by a manufacturer in the correct orientation at the factory.

Each of the exemplary buttons shown in FIGS. 1 and 3 bears a single Braille character. A single button may thus be used independently to display a single character, such as "S", e.g. to identify the size of a clothing garment as "small" for example. Alternatively, multi-character words or phrases may be spelled out using multiple buttons. The Braille indicia on the buttons may for example be used to convey information regarding a fabric color or pattern, fabric content, textile information, sizing, style, manufacturing location, care information, or inspirational text.

Alternative embodiments of buttons may bear other forms of Braille indicia, such as multiple Braille characters. In such cases, the buttons may be sized proportionally to the number of Braille characters on the face of the button. In such embodiments, the Braille characters should adhere to standard Braille spacing regulations, e.g. as defined by the Americans with Disabilities Act Accessibility Guidelines (ADAAG) or by a federal, state, provincial or local authority. Multi-character Braille indicia may allow a word, phrase or acronym to be spelled out using fewer buttons or possible a single button.

The attachment means may vary between button embodiments. For example, in some embodiments, the attachment means may be a central rearwardly protruding eye, e.g. a metal loop, rather than a shank. In other embodiments, the attachment means may be a clasp, i.e. a device with interlocking parts, at the rear of the button. Whatever attachment means are used, the point of attachment will typically be centrally disposed at the rear of the button.

When attached to fabrics such as a garments or fashion accessories, Braille buttons may be used as fasteners in the manner of conventional buttons. However, use of the buttons as fasteners is not mandatory. In some embodiments, Braille buttons may be attached to an article primarily to convey information about the article to a non-sighted person. Depending upon the type of article, the button may be attached at a predetermined location to facilitate its discovery by a non-sighted person—e.g. on a cuff of a shirt, the peak of a hat, or some other predetermined location. This may permit a non-sighted person to easily find the button and read the Braille indicia thereupon, e.g. to quickly ascertain a fabric color or pattern of the article for example.

Although the buttons depicted in FIGS. 1-3 all have disk-shaped bodies, it will be appreciated that the bodies of alternative button embodiments may have non-disk shapes. These may include, e.g., flat cuboid shapes (optionally having rounded edges), elongate shapes, and flattened spheroid shapes for example. Correspondingly, the front face of the button body that bears the Braille indicia is not necessarily circular in all embodiments. The front face of alternative button embodiments may have other shapes, such as square, rounded square, rectangular, rounded rectangular, elongate, or others.

In each of the illustrated button embodiments of FIGS. 1-3, the portion of the button face that bears the Braille indicia is substantially flat (planar). Use of a flat surface may facilitate detection of the raised dots by touch but is not absolutely required. For example, the surface of a button may be curved provided that the raised dots comprising Braille characters can still be readily detected and read by touch.

Braille Beads

Braille beads are similar to Braille buttons in that each of these devices has a face that bears Braille indicia. However, unlike buttons, beads further incorporate a passage for thread that extends through the body beneath the face bearing the Braille indicia, typically spanning a length or width of the bead. Braille beads can be attached to fabric by passing a thread through the passage and by sewing, weaving or otherwise attaching the thread to the fabric with the Braille indicia showing, i.e. facing outwardly.

Figure 4:
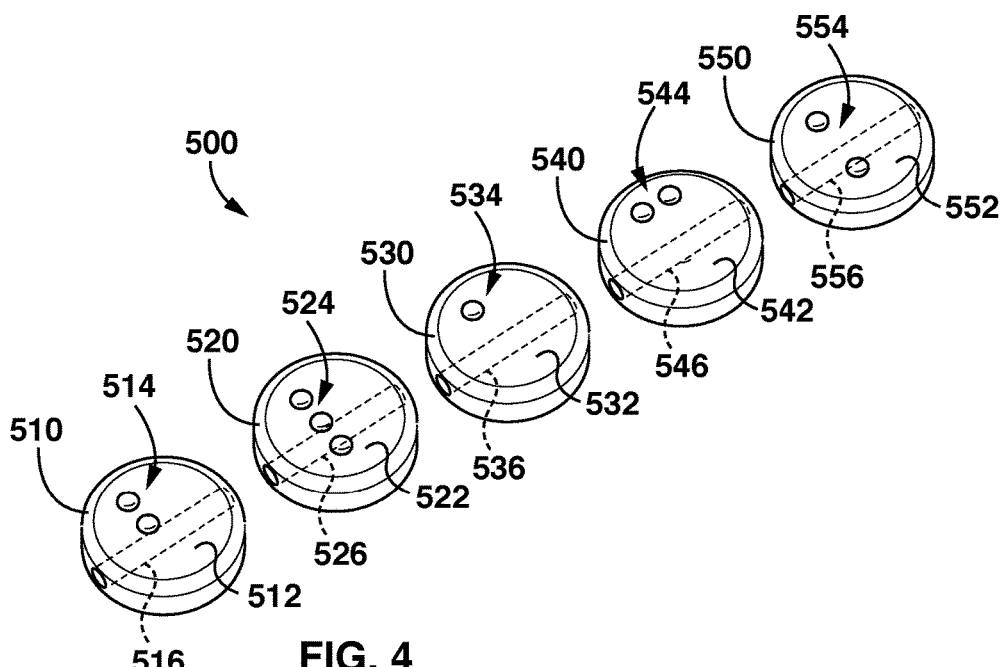
FIG. 4 is a front perspective view of a set of Braille beads.

Referring to FIG. 4, a set 500 of five exemplary Braille beads 510, 520, 530, 540 and 550 is depicted in perspective view. Each of the illustrated beads 510, 520, 530, 540, and 550 is shaped like a disk or puck with rounded or beveled edges, i.e. has a tablet-like or pill-like shape, with a circular front face 512, 522, 532, 542, and 552, respectively. In an exemplary embodiment, the diameter of the discs may be 0.25 to 0.5 inches, but other sizes may be used.

Each circular front face 512, 522, 532, 542, and 552 in FIG. 4 bears a Braille character 514, 524, 534, 544, and 554 ("B", "L", "A", "C", "K") respectively (a single Braille character being a form of Braille indicia). As with the Braille indicia on buttons 100 described above, the Braille indicia on beads 500 may comprise raised dots thereon that are integrally formed with their respective bead bodies. As such, the raised dots may have the same color and texture as the bead surface. This may render Braille indicia unobtrusive or unobvious to a visual observer of the beads, which again may appeal to some non-sighted users of the beads.

Regardless of which Braille character is represented on a bead, i.e. regardless which one(s) of the six grid positions of a Braille character has a raised dot, the position of the grid on the face of the button should be consistent between different ones of the beads 510, 520, 530, 540 and 550. This may facilitate distinguishing between distinct Braille characters on different beads.

In the illustrated embodiment, each bead 510, 520, 530, 540 and 550 has a substantially straight cylindrical passage 516, 526, 536, 546 and 556 extending through the body of the bead beneath the face 512, 522, 532, 542, and 552 respectively. The passage may be used as a thread hole for attaching the bead to fabric as described above. In FIG. 4, the passage is perpendicular to an orientation of the Braille character on the front face of the bead. The orientation of the passage relative to that of the Braille character(s) may vary between embodiments, e.g. for the reasons set forth below.

When a Braille bead has two opposing faces, like each of the beads shown in FIG. 4 (the rear faces facing downwardly and thus not being expressly visible in FIG. 4), each face may bear Braille indicia comprising at least one Braille character. The braille indicia on the front and rear faces may be referred to as primary and secondary Braille indicia respectively. The orientation of the secondary Braille indicia on the rear face of such a bead may be either the same as, or rotated relative to, the orientation of the primary Braille indicia on the front face of the bead.

In some applications, it may be desired for the orientation of Braille indicia on the visible face of a bead to be consistently "correct," i.e. oriented for readability, regardless of which of the opposing bead faces is showing, e.g. to account for the possibility that the bead faces may become swapped during use if the bead flips over. The relative orientation of the Braille indicia on each face that is needed to achieve this purpose may depend upon the orientation of the passage for thread relative to that of the Braille indicia.

For example, when the passage for thread is parallel to the orientation of the Braille character(s) on the front face of a bead, the above purpose may be achieved when the Braille indicia on the front and rear faces is oriented the same way. In contrast, when thread passage is oriented perpendicularly to the orientation of the Braille character(s) on the front face of a bead (e.g. as in each of the beads of FIG. 4), the above purpose may be achieved by inverting the secondary Braille indicia (i.e. rotating the indicia by 180 degrees on the rear face of the bead) relative to the orientation of the primary Braille indicia on the front face.

When Braille indicia are provided on each of two opposing faces of a Braille bead, the Braille indicia on the two faces may be identical or distinct. Use of the same Braille indicia on both faces of the bead may be intended to present the same information regardless of which face is showing. Use of distinct Braille indicia on each face may allow one of the distinct Braille indicia to be selectively displayed to convey different information, e.g. a current condition or status of the fabric to which the bead is attached (e.g. starched versus unstarched). In such use cases, the thread passing through the passage may be an elastic band. The elasticity of the band may tend to hold the bead against the fabric in its current orientation, to discourage any premature flipping of the bead (reversal of the opposing faces).

A Braille bead with two opposing faces may alternatively have Braille indicia only on one of the faces. This may permit a user of the bead to hide the Braille indicia whenever desired by flipping the bead over (i.e. by reversing the faces). The opposite face may be blank or may have a decorative element thereupon.

Although not expressly depicted in FIG. 4, a tactile bead orientation indicator may be defined on each of the beads in alternative embodiments. The tactile bead orientation indicator allows the orientation of the bead, and thus the Braille indicia, to be determined through touch. For example, the tactile bead orientation indicator may be a notch or indentation at a predetermined position on the body of the bead. As with tactile orientation indicators for buttons, the predetermined position for the tactile orientation indicator for beads may be fixed relative to a standardized position on the bead face of the notional two by three grid which dictates raised dot placement. Standardizing the location of this grid on the face of each Braille bead may help a non-sighted user distinguish between Braille characters on different beads. The tactile orientation indicator may accordingly reduce confusion over the identity of a Braille character on a bead. Various forms of tactile bead orientation indicators may be used, including at least some of those described above in respect of buttons.

Larger beads may define multiple Braille characters. In such embodiments, the characters should adhere to standard Braille spacing regulations. For example, the spaces between adjacent characters should be larger than the spaces between dots of a single character. Multi-character beads may allow a word or phrase to be spelled out using fewer beads or possible a single bead.

Beads may be used in different applications from buttons. For example, in the case of clothing, not all garments require buttons to fasten. Beads may be used even for clothing or other articles that ordinarily omit buttons. In some cases, side by side placement of beads may allow users to quickly read more information than if buttons were used. The reason is that some articles or garments may be practically limited in the number of buttons they may practically include and therefore may only permit words having a limited number of characters to be readily spelled out.

The Braille indicia on the beads may for example be used to convey information regarding a fabric color or pattern, fabric content, textile information, sizing, style, manufacturing location, care information, or inspirational text.

Alternative bead embodiments may have different shaped bodies and faces, including all the different shapes described above for button bodies and button faces.

Braille Clips

Like Braille buttons or Braille beads, described above, Braille clips have a face bearing Braille indicia. However, Braille clips are designed to be quickly and easily attachable and removable from fabric, e.g. without recourse to sewing. This may allow fabric articles, such as garments or fashion accessories, to be easily tagged with Braille indicia providing information about the fabric (e.g. color or pattern), the article (e.g. garment sizing or style), care information, or other information, as needed. Moreover, the relative ease with which the Braille clips can be attached and removed from articles may permit a user to remove the clip during use of the article, possibly storing the clip temporarily in a pocket, and then to reapply the clip to the article for storage and subsequent article identification by a non-sighted user, e.g. should display of the Braille text not be desired while the article is used.

In general, Braille clips include a body member having a face bearing Braille indicia (one or more Braille characters) and a clipping member configured to removably clip the body member to the fabric with the Braille indicia showing (facing outwardly). The body member and clipping member may be interconnected in various ways, as exemplified below. Each of the body member and clipping member may be elongate, although this is not required. Various embodiments of Braille clips, and various clipping member configurations, are described below.

Figure 5:
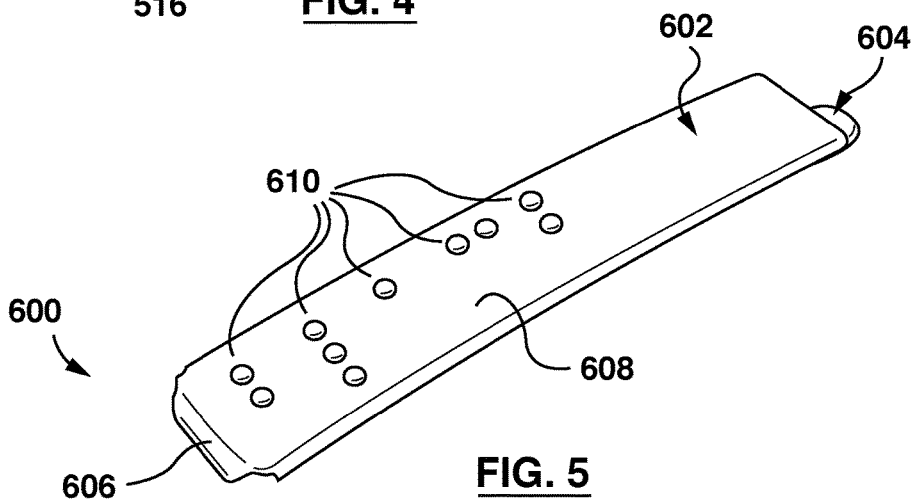
FIGS. 5 and 6 are front and rear perspective views, respectively, of a removable Braille clip.
Figure 6:
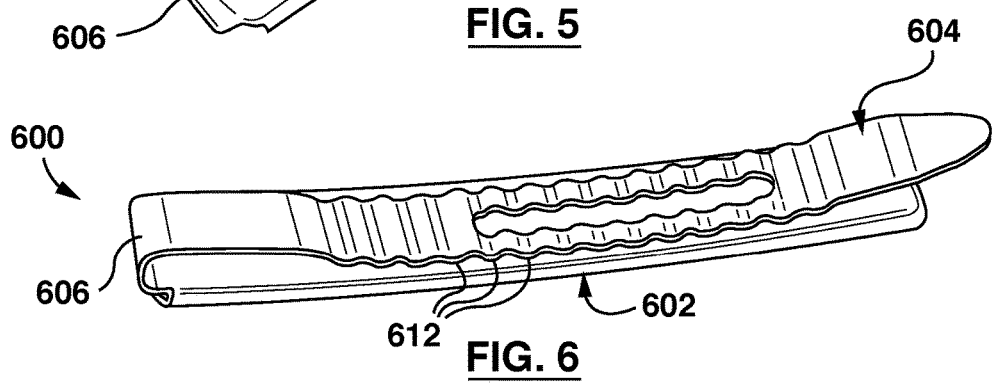

Referring to FIGS. 5 and 6, a first exemplary Braille clip 600 is shown in front and rear perspective view respectively. The example clip 600 includes an elongate body member 602 (alternatively referred to as a label portion) and an elongate clipping member 604 (alternatively referred to as a clipping portion). In this embodiment, the body member 602 and clipping member 604 are integrally formed, being joined together at joint 606, with the clip 600 possibly being stamped from a single piece of resilient metal and bent into shape.

The body member 602, best seen in FIG. 5, is intended to be outwardly facing when the clip has been attached to fabric. The body member 602 has an elongate face 608 bearing Braille indicia 610. In this example, the Braille indicia 610 comprises a sequence of five Braille characters spelling out the word "BLACK," spaced according to Braille spacing regulations along a length of the body member 602. In some Braille clip embodiments, the textual equivalent of the Braille indicia (not expressly shown) may appear someplace on the clip, e.g. on a reverse side from the Braille indicia, to facilitate comprehension by persons unable to read Braille text while avoiding display of the text during use.

The clipping member 604, best seen in FIG. 6, is resilient in this embodiment and has ridges or teeth 612 formed on a fabric-facing surface. These may help the clip 600 remain attached to fabric that is pinched between the body member 602 and 604 during use. In some embodiments, the ridges or teeth may be on a fabric-facing surface of the body member in addition to, or instead of, the clipping member. The presence of ridges or teeth is optional.

Some Braille clip embodiments may be configured to pinch fabric sufficiently strongly for the fabric to be washed in a conventional washing machine without detachment of the clip from the fabric. This may facilitate garment identification after washing for example.

Figure 7:
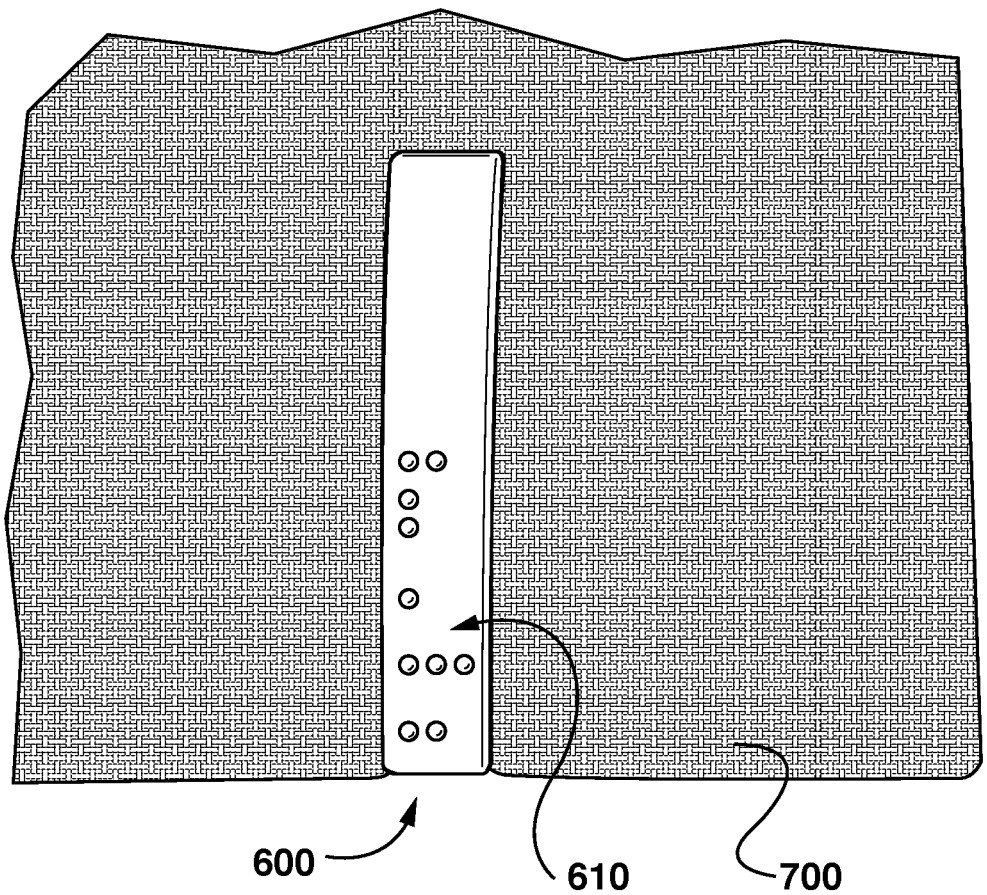
FIG. 7 is a front perspective view of the removable Braille clip of FIGS. 5 and 6 when attached to fabric.

Referring to FIG. 7, in use, the clip 600 may be clipped onto an edge of a piece of fabric 700 with the Braille indicia 610 facing outwardly. The body member 602 and the clipping member 604 may pinch the fabric therebetween by virtue of the resiliency of either or both of the body member 602 and the clipping member 604. When the fabric forms part of an article such as a garment, the clip may be applied to a predetermined location on the article (e.g. the middle of a tail of a shirt) to facilitate future location of the clip. The clip 600 may for example be attached to fabric vertically, as shown in FIG. 7, or horizontally.

Braille clips need not necessarily be made from metal. Some Braille clip embodiments may for example be made from another resilient material such as plastic, which is lightweight, durable and can be easily removed from clothing or a fabric based product without damage thereto. Other materials, including ones that are not resilient, may be used.

As noted, the body member 602 and the clipping member 604 of the exemplary Braille clip 600 are attached at one end at joint 606. In some embodiments, there may be a biasing means, such as a spring, at or near the point of attachment that biases the clipping portion and the label portion against one another.

Figure 8:
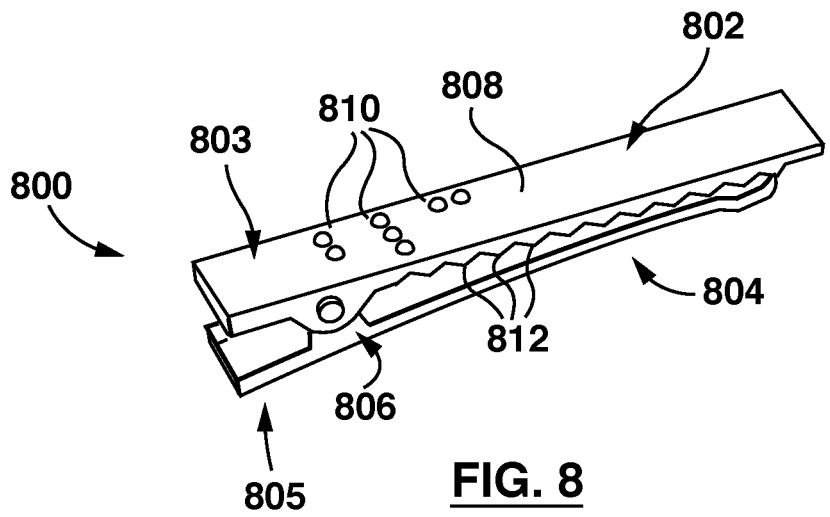
FIGS. 8 and 9 are front and rear perspective views, respectively, of another embodiment of removable Braille clip in a default closed state.
Figure 9:
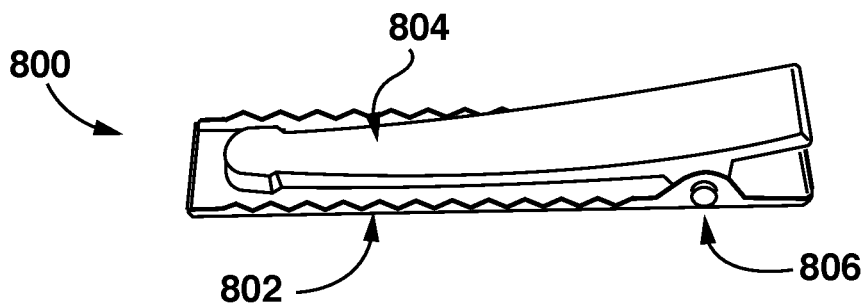
Figure 10:
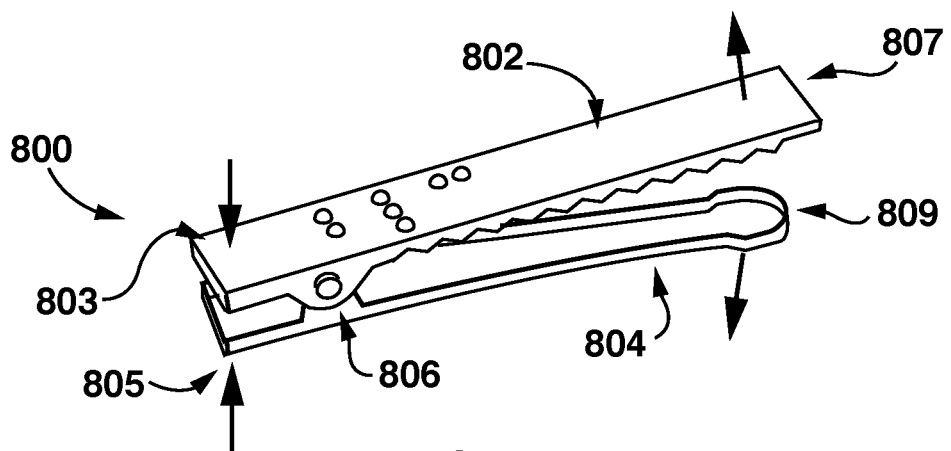
FIG. 10 is a front perspective view of the Braille clip of FIGS. 8 and 9 in an open state.

For example, referring to FIGS. 8-10, an alternative Braille clip 800 having an alligator clip like appearance is shown in perspective view. FIGS. 8 and 9 show the clip 800 in a default closed state in top and bottom perspective view, respectively. FIG. 10 shows the clip 800 in an open state in top perspective view.

The example clip 800 includes an elongate body member 802 and an elongate clipping member 804. The clipping member 804 may be considered to be in a closed state in FIGS. 8 and 10 and in an open state in FIG. 9. A hinge 806 links a proximal end 803 of the body member 802 with a proximal end 805 of the clipping member 804, at a position slightly offset from the very ends of these components (i.e. offset from the leftmost extent of the body member 802 and of clipping member 804 in FIG. 8). The hinge 806 provides for pivoting relative movement between the body member 802 and the clipping member 804. The offset permits the clip to be opened by pinching together the opposing proximal ends 803 and 805, as shown in FIG. 10.

The example hinge 806 is a spring hinge that biases the clipping member and the body member against one another in the default closed state shown in FIGS. 8 and 10. The spring, which is a form of biasing element, is not expressly shown in any of the figures. When the proximal ends 803, 805 of the body member 802 and clipping member 804 are pinched together as in FIG. 10, the biasing force of the spring is overcome, causing the distal ends 807, 809 of those components to separate, as shown in FIG. 10. This allows the clip 800 to easily be positioned at an edge of a fabric article and attached thereto simply by releasing the clip.

The body member 802, best seen in FIGS. 8 and 10, is intended to be outwardly facing when the clip 800 has been attached to fabric. An elongate face 808 of body member 802 bears Braille indicia 810. In this example, the Braille indicia 610 comprises a sequence of three Braille characters.

The exemplary body member 802 of FIG. 8 has teeth 812 defined on its fabric-facing surface. In alternative embodiments, the teeth could be omitted or could be present on a fabric-facing surface of the clipping member 802, either instead of or in conjunction with the teeth 812 on the body member 802.

Figure 11:
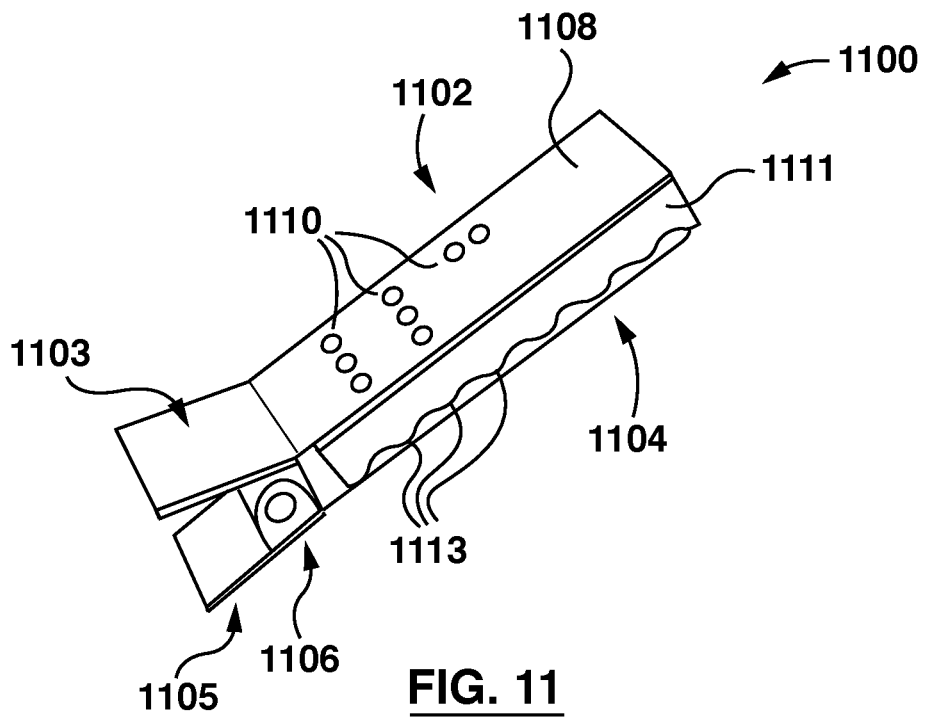
FIGS. 11 and 12 are front and rear perspective views of another embodiment of removable Braille clip in a default closed state and an open state, respectively.
Figure 12:
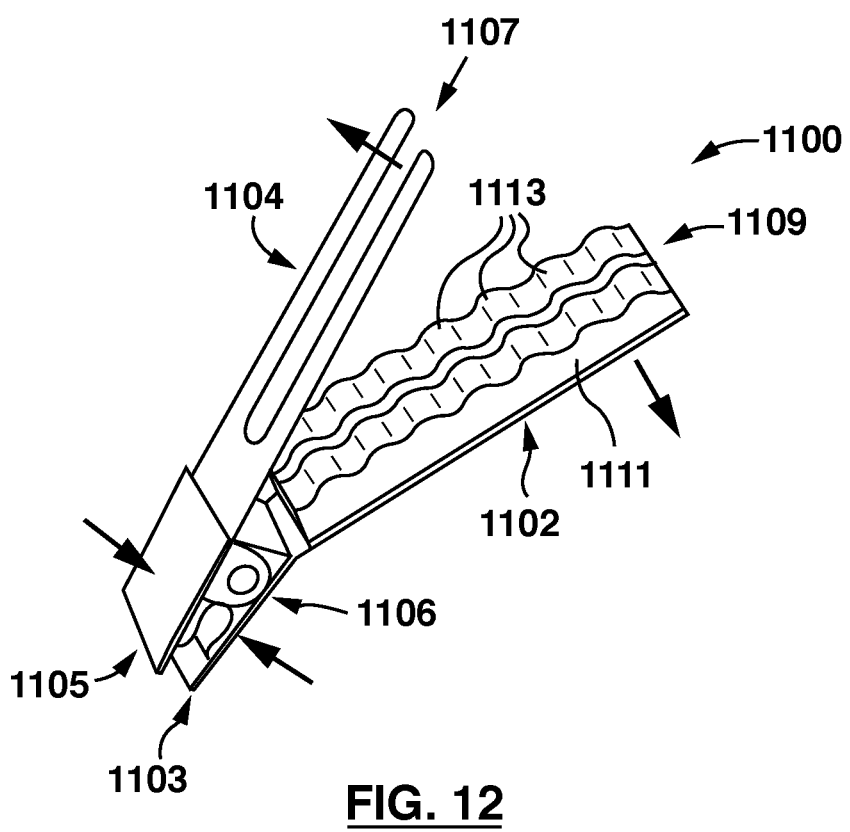

Turning to FIGS. 11 and 12, another embodiment of Braille clip 1100, in this case having a pinch clip like appearance, is shown in perspective view. FIG. 11 shows the clip 1100 in a default closed state in top perspective view, and FIG. 12 shows the clip 1100 in an open state in bottom perspective view.

The example clip 1100 includes a body member 1102 and a clipping member 1104. The body member 1102 bears Braille indicia 1110 on its external face 1108. An opposing, fabric-facing surface of the body member 1102 has a non-slip material 1111 affixed thereto. The non-slip material may for example be a resilient material such as rubber or vinyl. In the present example, the non-slip material presents ridges or teeth 1113 on its fabric-facing surface. It is not required for non-slip material to have ridges or teeth when used. In alternative embodiments, non-slip material could be present on a fabric-facing surface of the clipping member 1104, either in conjunction with or instead of the non-slip material 1111 on the body member 1102. The non-slip material and/or teeth may enhance a gripping power of the clip when clipped to fabric.

In the present embodiment, the clipping member 1104 defines two separate prongs. The clipping member 1104 may be considered to be in a closed state in FIG. 11 and in an open state in FIG. 12. A hinge 1106 links a proximal end 1103 of the body member 1102 with a proximal end 1105 of the clipping member 1104, at a position slightly offset from the very ends of these components (i.e. offset from the leftmost extent of the body member 1102 and clipping member 1104 in FIG. 11). The hinge 1106 provides for pivoting relative movement between the body member 1102 and the clipping member 1104. The offset permits the clip to be opened by pinching together the opposing proximal ends 1103 and 1105.

The example hinge 1106 is a spring hinge that biases the clipping member and the body member against one another in a default closed state shown in FIG. 11. The spring, which is a form of biasing element, is not expressly shown in any of the figures. When the proximal ends 1103, 1105 of the body member 1102 and clipping member 1104 are pinched together, the biasing force of the spring is overcome, causing the distal ends 1107, 1109 of those components to separate, as shown in FIG. 12. This allows the clip 1100 to easily be positioned at an edge of a fabric article and attached thereto simply by releasing the clip. The proximal end 1103 of the body member 1102 is upturned to provide a greater opening range.

Figure 13:
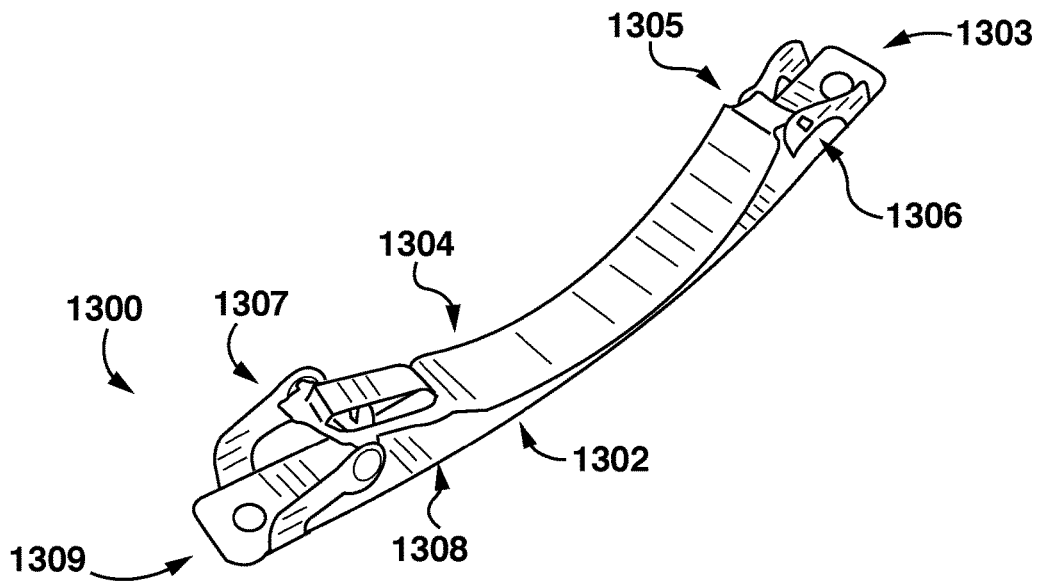
FIGS. 13 and 14 are rear perspective views of another embodiment of removable Braille clip in a default closed state and an open state, respectively.
Figure 14:
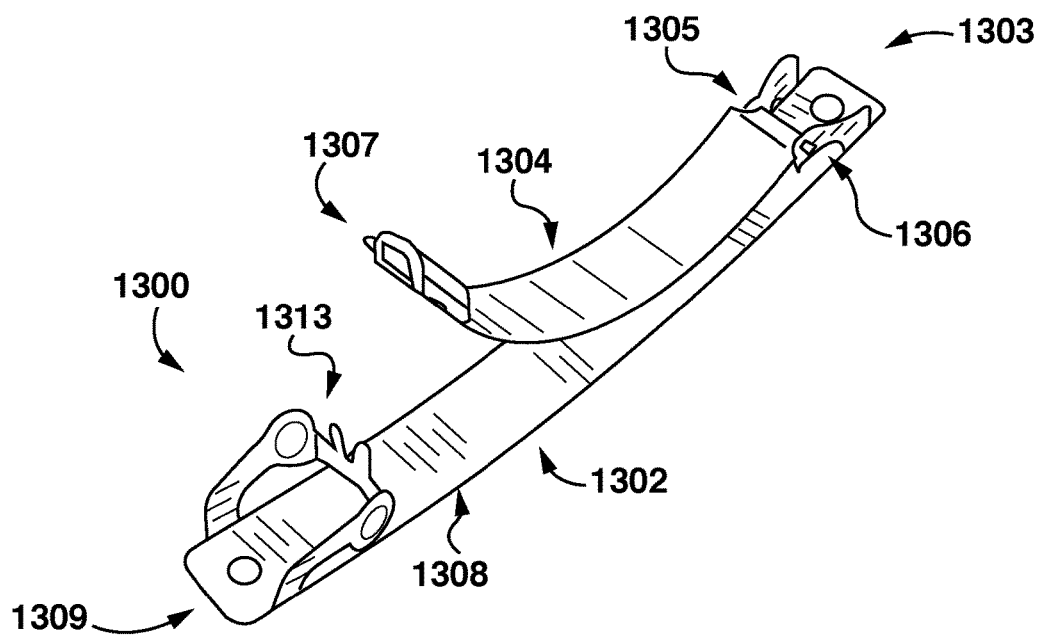

Referring to FIGS. 13 and 14, another embodiment of Braille clip 1300, in this case having a French clip like appearance, is shown in rear perspective view. FIG. 13 shows the clip 1300 in a closed state, and FIG. 14 shows the clip 1300 in an open state.

Clip 1300 includes a substantially rigid body member 1302 and a resilient clipping member 1304, both being elongate and curved in this embodiment. A face 1308 of the body member 1302, which bears Braille indicia (not visible in FIG. 13 or 14), is intended to face outwardly during use.

A hinge 1306 links a proximal end 1303 of the body member 1302 with a proximal end 1305 of the clipping member 1304. The hinge 1306 provides for pivoting relative movement between the body member 1302 and the clipping member 1304.

As best seen in FIG. 14, the body member 1302 has a fastener 1313 at its distal end 1309. The fastener 1313 is designed to releasably fasten the distal end 1307 of the clipping member 1304 to the body member 1302. The illustrated fastener 1313 is opened by lateral pinching. Other type of fasteners, including snap closures, could instead be used in different embodiments.

When the clip 1300 is in the closed state of FIG. 13, fastener 1313 fastens the distal end 1307 of the clipping member 1304, with the clipping member 1304 being held against the body member 1302 in a compressed state. In view of the resiliency of the clipping member 1304, the clipping member 1304 and the body member 1302 of the closed clip will exert pressure against one another. When a strip of fabric, such as a tie, a scarf, or a belt, is sandwiched between these components, the clip 1300 will grip onto, and become attached to, the fabric. In some embodiments, gripping power may be enhanced by ridges, teeth or a non-slip material on the fabric-facing surface of either one or both of the body member 1302 and clipping member 1304, but this is not required.

Figure 15:
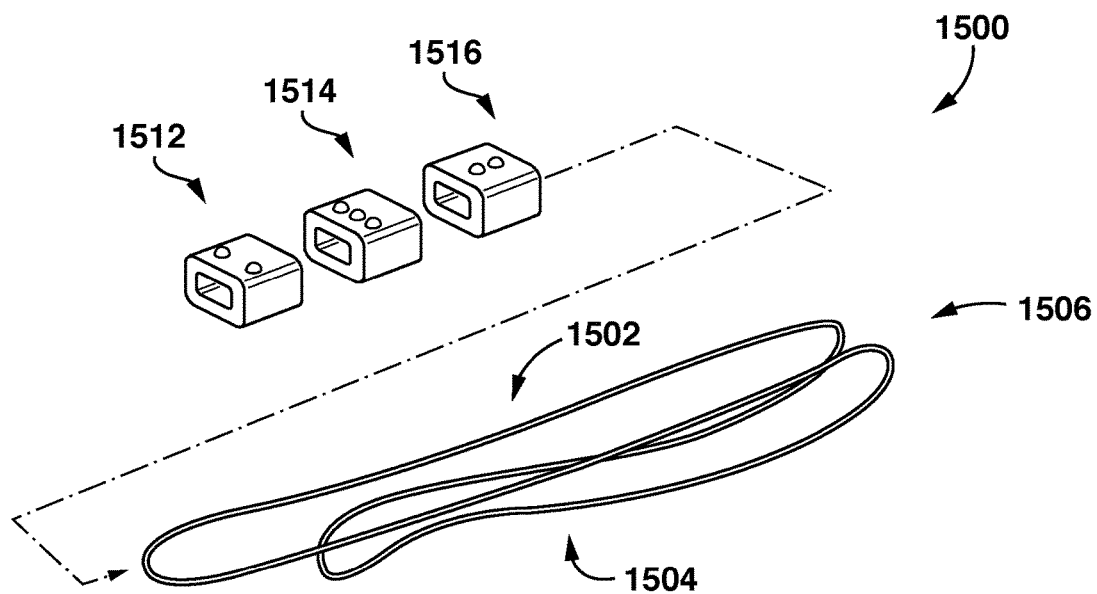
FIGS. 15 and 16 are exploded and front perspective views, respectively, of another embodiment of removable Braille clip with customizable Braille indicia.

In some clip embodiments, the Braille indicia may be reconfigurable. For example, referring to FIGS. 15 and 16, another embodiment of clip 1500 is depicted in exploded and perspective view, respectively. The example clip 1500 includes a body member 1502 and a clipping member 1504. The body member 1502 and clipping member 1504 are integrally formed, being joined together at joint 1506, having been formed from a single loop of resilient wire bent into the shape shown in FIG. 15.

The body member 1502 includes three removable segments 1512, 1514, and 1516, each defining a single Braille character on one face (outer surface). Alternative embodiments may define multiple Braille indicia per segment. In the illustrated embodiment, each removable segment 1512, 1514 and 1516 defines a receptacle 1522, 1524 and 1526 for receiving a (wire) portion of the body member 1502. The removable segments may be made from a resilient material such as rubber or silicone.

Figure 16:
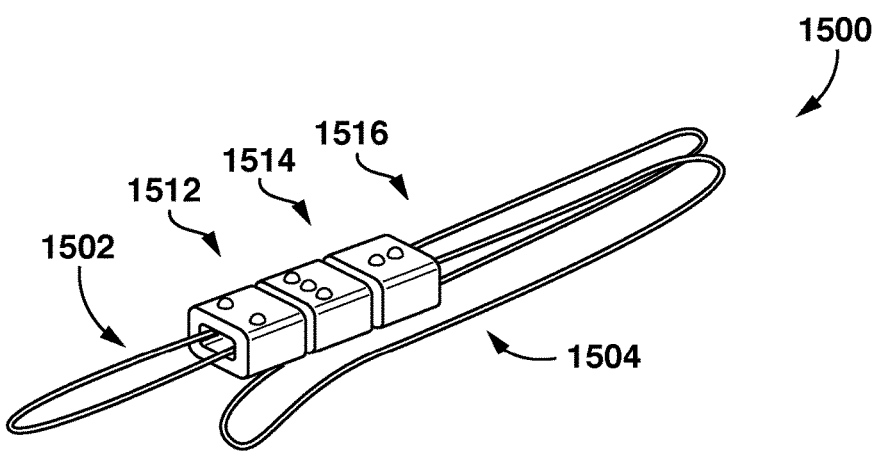

When the removable segments 1512, 1514 and 1516 are threaded onto the body member 1502 as shown in FIG. 16, the resiliency of the body member and/or the segments may hold them in place. In some embodiments, the sizing of both the segments 1512, 1514 and 1516 and the sizing/scaling of the Braille indicia appearing on their faces may be such that, when the segments are abutted against one another in sequence as in FIG. 16, standard Braille spacing conventions between Braille indicia will be achieved.

The removable segments 1512, 1514 and 1516 can be rearranged or substituted for other removable segments bearing other Braille indicia. This permits the clip 1500 to be easily reconfigured or customized with Braille indicia according to the possibly changing needs of a user. The clip 1500 may be sold in the form of a kit including multiple removable segments bearing different removable indicia, e.g. with each removable segment bearing one Braille character.

Alternative embodiments may employ different mechanisms for removably attaching the removable segments to the body member. In one example, each segment may comprise a protrusion on a rear face that is received in a complementary receptacle on the body member. In another example, the removable segments may be attached magnetically.

Figure 17:
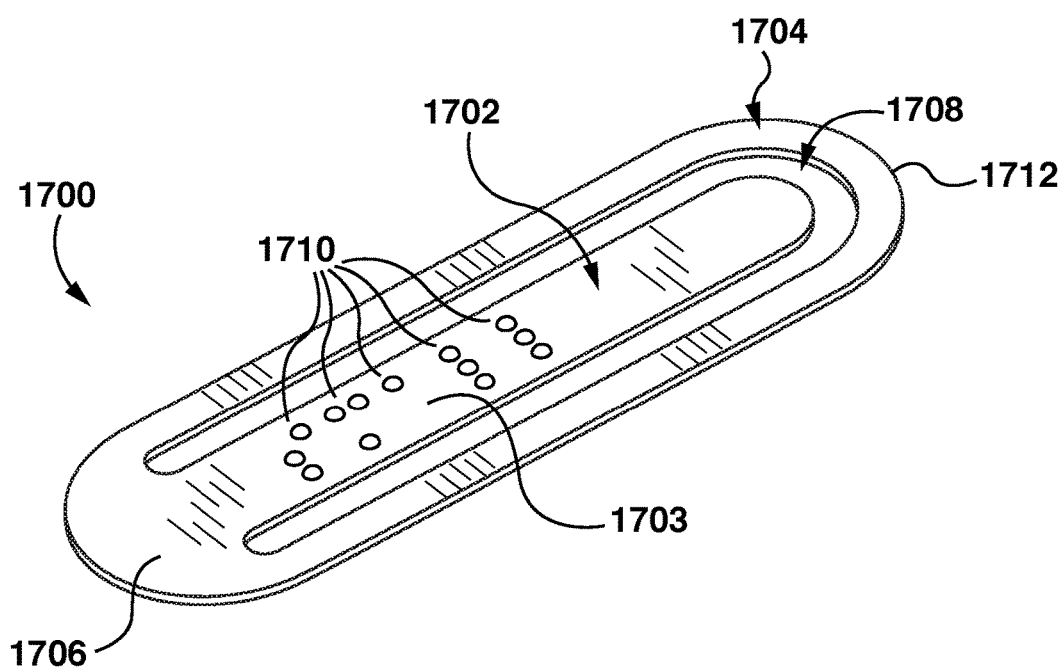
FIG. 17 is a front perspective view of another type of removable Braille clip.

In some Braille clip embodiments, the clipping member may not directly oppose the body member. For example, referring to FIG. 17, another embodiment of Braille clip 1700 is shown in front perspective view. The example clip 1700 includes a body member 1702 and a clipping member 1704. The body member 1702 and clipping member 1704 are integrally formed, being joined together at joint 1706. The clip 1700 may be formed from a single piece of resilient metal or plastic for example.

The body member 1702 has an elongate face 1703 bearing Braille indicia 1710. The clipping member 604 comprises a resilient frame that is substantially coplanar with the body member 1702 when the clip 1700 is not attached to fabric. A gap 1708 may exist between the body member 1702 and the clipping member 1704.

In use, a distal end 1712 of the clipping member 1704 (resilient frame) may be deformed downwardly to allow an edge of a fabric article (not depicted) to be slipped between the body member 1702 and the clipping member 1704, with the body member 1702 and Braille indicia 1710 showing. In view of the resiliency of the clipping member 1704 and/or body member 1702, the fabric may be gripped between the two, holding the clip 1700 in place. In some embodiments, fabric-facing surfaces of the body member 1702 or clipping member 1704 may have ridges, teeth, or a non-slip surface to enhance gripping power.

In general, Braille clips may employ various shapes that are not necessarily elongate. In some embodiments, a free end of the body member or clipping member may have an upturned edge or lip to facilitate insertion of a fabric edge between the body member and the clipping member.

A possible use of a removable Braille clip is to encode color information. The clip containing this information may be consistently attached at the same location on each garment, such as a bottom right hand corner of each garment in a clothing collection. This may allow customers to readily distinguish between different types of information in either of a home and shopping environment. In this context, different types of information may include fabric color, fabric content, textile information, sizing, style, manufacturing location, or care information. Because color is often a prominent characteristic of a fabric item, this information may be placed on a different type of identification system (i.e. the removable Braille clip) to allow a non-sighted person to easily feel for the removable clip opposed to having to read all of the Braille on a product every time it is used.

Other possible uses of Braille clips may include:

use as a tie clip.

pairing socks together.

pairing shoes together, e.g. by their uppers. Notable, the wearing of mismatched shoes may be a risk for non-sighted users owning several similar styles. Shoes whose uppers are made of thick materials can be clipped together by their laces rather than their uppers.

"scarf clip"—a Braille clip such as clip 1300 of FIG. 13 could be used as a scarf/ascot clip instead of tying a knot. This may provide an appearance similar to wearing a tie clip.

"skirt clip"—a Braille clip can be used in place of a safety pin to attach a kilt/skirt. A Braille clip can also hold tights and a skirt together to discourage them from riding up separately while being worn.

"sleeve/hem clip"—a Braille clip can hold up/secure a rolled up sleeve or pant cuff. This provides additional placement opportunities for a color indicator tag that are comfortable and unobtrusive, rather than at a more standard location, e.g. at a bottom right hand corner of a garment. Aesthetically, this provides additional adornment similar to wearing a cufflink. Alternatively, a Braille clip could be worn on a pocket or collar, similar to wearing a broach.

secure hijab/head scarf.

clip mittens together.

"hat clip"—attach Braille clip to hat.

underwear/bra clip—A Braille clip could be used to pair matching underwear and bras. Additionally, undergarments of the same color could be attached using a Braille clip to identify the color and keep items together.

bedding clip—A Braille clip could be used to pair matching bedding sets or sheets of a particular color.

identification/card holder—A Braille clip could be used to group and/or identify ID cards (e.g. driver's licenses), credit cards or bank cards. Alternatively, money/paper bills can be clipped together as a group or sorted by value within individual clip identifiers marked with a denomination, e.g. $5, $10, $20, etc.

headphone clip—A Braille clip could be used to clip headphones (e.g. by their wire) to clothing for use while exercising or performing everyday tasks. When this is not done, a freely dangling cord could pose a safety risk to a non-sighted person, who may become tangled in the cord or possibly trip. A Braille clip used to identify an article of clothing could be relocated to the collar or an area close to the head to also function as a headphone clip.

It will be appreciated that, in the present disclosure, any reference to a "thread" for attaching a button or bead should be understood to possibly include other types of filaments, such as string, elastic bands, or wire. Non-sighted persons may include persons with limited vision who are not totally blind.

Various alternative embodiments not expressly depicted or described herein may fall within the scope of the following claims.

What is claimed is:

1. A clip bearing Braille indicia removably attachable to fabric, the clip comprising:
   a body member having a face bearing Braille indicia, the Braille indicia being multiple Braille characters; and
   a clipping member configured to removably clip the body member to the fabric with the Braille indicia facing outwardly,
   wherein the body member comprises multiple removable segments, each removable segment having defined thereon at least one of the multiple Braille characters respectively, the removable segments being removable from the body member to facilitate reconfiguration of the Braille indicia, the removable segments and the Braille characters being scaled such that, when the removable segments are abutted against one another in sequence, standard Braille spacing conventions between Braille indicia are achieved.

2. The clip of claim 1 wherein the body member and the clipping member are integrally formed and wherein at least one of the body member and the clipping member is resilient.

3. The clip of claim 2 wherein the clipping member comprises a resilient frame that is substantially coplanar with the body member when the clip is not in use.

4. The clip of claim 1 wherein the body member whose face bears the Braille indicia is elongate and wherein the Braille indicia comprises a sequence of Braille characters along a length of the body member.

5. The clip of claim 1 further comprising a hinge linking a proximal end of the body member with a proximal end of the clipping member, the hinge providing for pivoting relative movement between the body member and the clipping member.

6. The clip of claim 5 further comprising a biasing element for biasing the clipping member against the body member in at least a closed position of the clipping member.

7. The clip of claim 5 wherein the hinge is a spring hinge that biases the clipping member and the body member against one another.

8. The clip of claim 7 wherein the clip is a pinch clip or alligator clip.

9. The clip of claim 5 further comprising a fastener at a distal end of the body member for releasably fastening a distal end of the clipping member to the body member.

10. The clip of claim 1 wherein either one or both of the body member and the clipping member has a non-slip material on a fabric-facing surface.

11. The clip of claim 1 wherein either one or both of the body member and the clipping member has ridges or teeth on a fabric-facing surface.

12. The clip of claim 1 wherein each removable segment comprises a resilient material.

13. The clip of claim 1 wherein either the body member or the removable segments defining the Braille indicia comprises a receptacle for receiving a portion of the other of the body member and the removable segments defining the Braille indicia.

14. A bead bearing Braille indicia for attachment to an article using a filament, the bead comprising:
   a body having a face, the face bearing Braille indicia, the Braille indicia being one or more Braille characters; and
   a passage through the body beneath the face, the passage for receiving the filament, the passage being substantially cylindrical, wherein the face bearing the Braille indicia is a front face and wherein the body has an opposing rear face, wherein the Braille indicia on the front face comprises primary Braille indicia and wherein the rear face bears secondary Braille indicia, wherein the primary and secondary Braille indicia are oriented relative to one another so that when the front and rear faces of the body are reversed through rotation of the body by 180 degrees about the filament, the primary and secondary Braille indicia are consistently oriented for reading when showing.

15. The bead of claim 14 wherein the primary Braille indicia on the front face of the body is the same as the secondary Braille indicia on the rear face of the body.

16. The bead of claim 14 wherein the primary Braille indicia on the front face of the body differs from the secondary Braille indicia on the rear face of the body.

17. The bead of claim 14 further comprising a tactile bead orientation indicator on the body of the bead for determining an orientation of the Braille indicia on the face of the bead by touch, the tactile bead orientation indicator being a notch or indentation at a predetermined position on the body of the bead relative to a notional two by three grid on the bead face for placing raised dots of a Braille character.

* * * * *